Oct. 25, 1960

C. W. DAVIS ET AL 2,957,275

METHOD AND APPARATUS FOR PRODUCING SHEET GLASS

Filed Aug. 5, 1955

INVENTORS
Curtis W. Davis
BY and Delmar E. Carney
Nobbe & Swope
ATTORNEYS

United States Patent Office 2,957,275
Patented Oct. 25, 1960

2,957,275

METHOD AND APPARATUS FOR PRODUCING SHEET GLASS

Curtis W. Davis and Delmar E. Carney, Toledo, Ohio, assignors to Libbey-Owens-Ford Glass Company, Toledo, Ohio, a corporation of Ohio Filed Aug. 5, 1955, Ser. No. 526,625

4 Claims. (Cl. 49—3)

The present invention relates to the manufacture of plate glass, and more particularly to a method and apparatus for treating glass to prevent breakage during surfacing.

In the production of plate glass, molten glass from a glass tank or furnace is fed through a suitable opening or spout in the furnace and then between forming rolls which impart a substantially flat shape to the glass to form a continuous glass sheet or ribbon, after which, the sheet or ribbon is passed through a suitable annealing lehr. When annealing has been completed, the glass is conveyed, in one way or another, to grinding stations where the surfaces thereof are ground to make them substantially true and flat by means of large circular grinding wheels disposed above, or above and below, the path of the glass.

Heretofore, large amounts of breakage occurred when the glass was ground, the cause of which was unknown. However, in accordance with the present invention, it has been found that the edge portions of the sheet or ribbon tend to bulge and/or curl slightly after forming because of the manner in which the sheet lays on the conveying rolls or by other inherent factors in the fabricating process. Consequently, in passing the ribbon or sheet beneath the grinding wheels which extend out beyond the edges thereof, there is a tendency for the wheels to make contact first with the bulb or enlarged portion at the edge of the sheet or ribbon before making contact with the central or major surface area thus causing fractures to originate at the edges which, in some cases, migrate inwardly and into the interior of the sheet resulting in breakage.

To alleviate these breakage conditions, according to the present invention, it was found that if the glass sheet or ribbon were treated along the edge portions thereof and reduced in thickness in a predetermined manner before passing to the annealing lehr, that the bulb which normally formed along the edge portion thereof could be depressed below the major surface area of the sheet, and the problem of the grinding wheels or discs engaging the edges before the main central surface area could be eliminated.

It is therefore a primary object of this invention to provide a method and apparatus for improving the surfacing characteristics of glass sheet material.

A further object of the invention is to provide a method of reducing breakage in glass sheet material during the grinding thereof.

Another object of the invention is to provide means for reducing the thickness of a glass sheet or ribbon before it is annealed to reduce the cross sectional area of the edge portions of the sheet after it is annealed.

A further object of the invention is to reduce the tendency of thin glass sheet material to bulge or curl at the edge portions thereof so as to protrude above the major surface area of the sheet.

Other objects and advantages of the invention will become more apparent during the course of the following description when taken in connection with the accompanying drawings.

In the drawings, wherein like numerals are employed to designate like parts throughout the same:

The present invention is not restricted to any particular type of glass grinding or surfacing, however, it is especially well adapted for use in connection with the simultaneous grinding of both surfaces of a sheet or ribbon of glass and will be described in that relation here.

Figure 1:
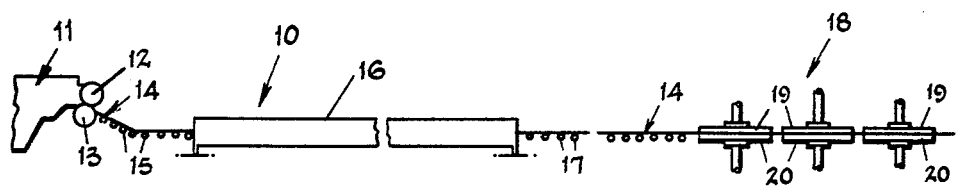
Fig. 1 is a schematic view of a plate glass producing apparatus.

With reference now to the drawings, there is shown in Fig. 1 a schematic view of a plate glass producing apparatus 10. More particularly, the apparatus comprises generally a glass tank furnace 11 having a mass of molten glass therein which is fed between upper and lower forming rolls 12 and 13 respectively to form a sheet or ribbon of glass 14 of predetermined shape and thickness. As the sheet leaves the forming rolls, it is received upon rolls 15 or other suitable conveying means and carried through an annealing lehr 16 wherein the temperature is gradually reduced to create the desired strength and strain pattern in the sheet.

Upon leaving the annealing lehr, the continuous ribbon of glass 14 is conveyed on rollers 17 through a grinding apparatus indicated generally at 18 to properly surface the major flat surfaces thereof. As shown herein, the grinding apparatus 18 comprises upper and lower rotating wheels or discs 19 and 20 respectively which simultaneously grind both surfaces of the glass sheet or ribbon as it passes therebetween.

In the past, during the grinding or surfacing of the glass it was found that large amounts of unexplainable breakage occurred as the sheet began to traverse the path beneath the grinding discs or wheels. A great portion of this breakage, as determined by the present invention, had its basis in the fact that the grinding discs or wheels made contact with the edge areas of the sheet before making contact with the major central area of the sheet. As a consequence, tremendous stresses were placed upon the inherently weaker edge portions of the sheet as a result of the weight of the grinding wheels bearing down upon the edge portions and because of the shock forces exerted upon such edge portions by the abrasive or grinding effect of the wheels. These stresses naturally, in some cases, caused fissures or cracks to originate along the edges of the sheet which spread inwardly to the central portion of the sheet causing substantial amounts of breakage and considerable losses in grinding time.

According to the present invention, to alleviate this tendency of the glass to chip and fracture as it is being surfaced, it has been found that by properly shaping the edge of the glass sheet 14 before it is annealed that the edge portions might be depressed slightly from the plane of the major surface of the sheet. This shaping of the glass ribbon before it reaches the annealing lehr has been accomplished by contouring the upper forming roll 12 such that the edge portions of the sheet will be made slightly thinner, according to a predetermined curvature, than the remaining central and major portion of the sheet. While it has been proposed in the past to contour the forming rolls in one way or another to produce a flat area along the central portion of the sheet or ribbon, the forming rolls of the invention have been specifically contoured to reduce the thickness of the sheet along the edges or to dispose the edges below the major surface area of the sheet for the purpose of reducing breakage during surfacing.

Figure 2:
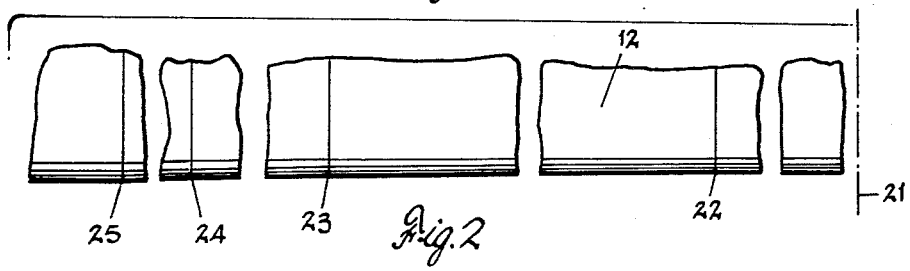
Fig. 2 is a fragmentary sectional view of a forming roll of the invention.

As illustrative of how the upper forming roll 12 has been shaped to accomplish the shaping of the edge portions of the glass sheet, reference is made to Fig. 2 wherein there is fragmentarily shown a contour of the upper forming roll 12 which has proven to be very satisfactory. In this embodiment of the forming roll, used in the production of a glass sheet or ribbon having a gross width of approximately 96½ inches, starting from the center line indicated at 21 the forming roll is of a uniform diameter on both sides thereof for a distance of approximately 18 inches, or to the point 22. From point 22 to the point 23, a distance of approximately 26 inches, the forming roll progressively increases diameter to a maximum of approximately 0.011 inch at the point 23. Between point 23 and point 24, a distance of approximately 3¼ inches, the forming roll progressively increases in diameter by 0.017 inch. Between point 24 and the point 25, a distance of approximately 1½ inches, the forming roll progressively increases in diameter to a maximum of 0.0625 inch at the point 25.

Figure 3:
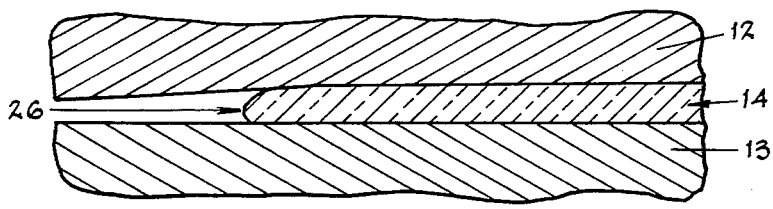
Fig. 3 is a fragmentary sectional view illustrating the action of the forming roll of the invention on semi-molten glass as it is being reduced to a predetermined shape and thickness.
Figure 4:
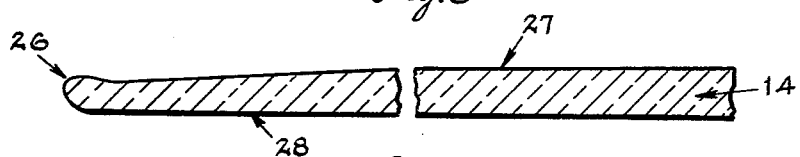
Fig. 4 is a fragmentary sectional view of an annealed sheet or ribbon of glass formed according to the invention.

With reference now to Fig. 3, there is shown the relationship between the glass 14 and the respective forming rolls 12 and 13 as it is being shaped by the rolls. While the contour of the forming roll 12 changes over a good portion of the width of the sheet, the initial contour change from the point 22 to the point 23 of the roll 12 is to compensate for roll deflection and stretch of the glass to produce a substantialy flat sheet except for the extreme edges 26 which, as illustrated in Fig. 4, are reduced in thickness. More particularly, as shown in Fig. 4, the edge 26 of the sheet is curled up slightly after it has been hardened but still is below the upper major surface 27 of the sheet or ribbon and substantially flush with the lower major surface 28.

Figure 5:
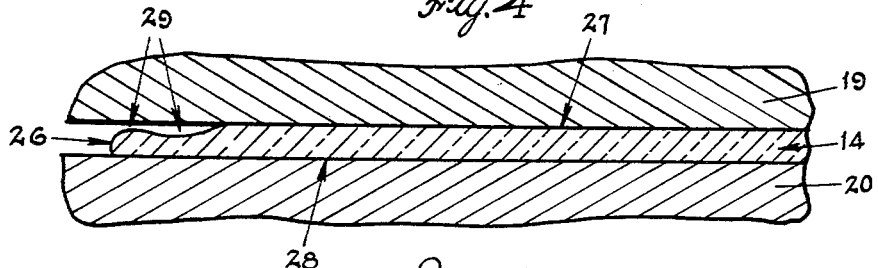
Fig. 5 is a fragmentary sectional view illustrating the relationship between the glass and the surfacing tools as the glass is being surfaced.

Thus, in passing between the surfacing wheels 19 and 20, the edge portions 26 of the sheet are not contacted by the wheels first. Instead, as is illustrated in Fig. 5, the central or major surface area 27 of the ribbon is contacted first. It will be noted that a space 29 exists between the extreme edge portions 26 of the sheet and the upper surfacing wheel 19, allowing the surfacing wheel 19 to evenly contact the major upper surface 27 of the sheet.

Consequently, in grinding glass sheet or sheets produced in accordance with this invention, extreme shock forces and stresses are not imparted to the edge of the sheet and the tendency of the sheet to break or crack as a result of the fissures produced in the edges thereof is substantially eliminated. Thus, the invention is particularly adapted to the production of very thin sheet material, in the neighborhood of ⅛ inch in thickness, which has a very decided tendency to curl at its edges after forming and which is also extremely fragile because of its thinness making it necessary that the utmost care be exercised in the surfacing process.

It will also be apparent that the invention produces very decided advantages in the polishing of sheet material since it is not necessary to trim the bulb portion from the sheet following grinding. By leaving the smooth contoured bulb on the sheet material as it is being polished, the polishing felts are not subjected to the sharp edges which normally result when the edges of the sheets are trimmed before polishing and the tendency for such sharp edges to tear and cut the felts is greatly reduced.

Although the preferred embodiment of the invention has been disclosed above, it will be appreciated that the tendency of the ribbon or sheet to bulge or curl at the edges may also be eliminated by other means such as by scrapper or roller so as to reduce the thickness of the sheet along such portions. Furthermore, while the invention has been described particularly with regard to the simultaneous surfacing of both sides of a sheet or ribbon of glass, it may also be used where the ribbon or sheet material is cut into sheets and embedded in plaster on carts which pass beneath only upper surfacing wheels or discs. Also, it will be evident that different contours on the forming rolls may be used depending on the size and thickness of glass being produced.

It is of course to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. A method of forming plate glass, comprising, removing molten glass from a furnace between opposed forming rolls, forming said molten glass into a glass sheet between said rolls and simultaneously depressing the surface of both marginal edges of said molten glass so that the surfaces of both marginal edges of the sheet as formed will be below the surface of the central area of the formed sheet whereby to reduce the thickness of both marginal edges of the formed sheet as compared to the thickness of the central portion of the formed sheet and then grinding the sheet.

2. A method of forming plate glass having ground and polished surfaces, which comprises, flowing molten glass from a furnace, rolling the molten glass to form a continuous sheet simultaneously, with rolling of the molten glass into a sheet, shaping the edge portions of the molten glass, so that they are thinner than the central portion of the molten glass, moving said sheet along a definite path, annealing said sheet as it moves along said path, and grinding said sheet as it moves along said path by grinding tools which extend across the entire width of said sheet to engage and initially contact a central area of said sheet no later than the edge portions are contacted.

3. Apparatus for forming plate glass having ground and polished surfaces, comprising, a container having a source of molten glass therein, means including a pair of forming rolls for forming a glass ribbon from said molten glass, molten glass shaping means on at least one of said forming rolls to reduce the cross sectional area of the edge portions of the molten glass as compared to the cross sectional area of the central portion of the molten glass during formation of said ribbon, means for moving said ribbon along a definite path, and surfacing tools mounted along said path to surface said ribbon such that a central area of the ribbon will be generally surfaced no later than said edge portions.

4. An apparatus as defined in claim 3, wherein said molten glass shaping means includes an inclined peripheral surface on at least one of said rolls whereby the peripheral surfaces of said rolls are positioned closer to one another along the side edges of the ribbon than they are along the central portion thereof.

References Cited in the file of this patent

UNITED STATES PATENTS

| | | |
|---|---|---|
| 697,229 | Appert | Apr. 8, 1902 |
| 1,560,078 | Gelstharp | Nov. 3, 1925 |
| 1,608,657 | Howard | Nov. 30, 1926 |
| 1,759,225 | Drake | May 20, 1930 |
| 2,270,362 | Waldron | Jan. 20, 1942 |
| 2,272,651 | Waldron | Feb. 10, 1942 |